Patented Mar. 14, 1950

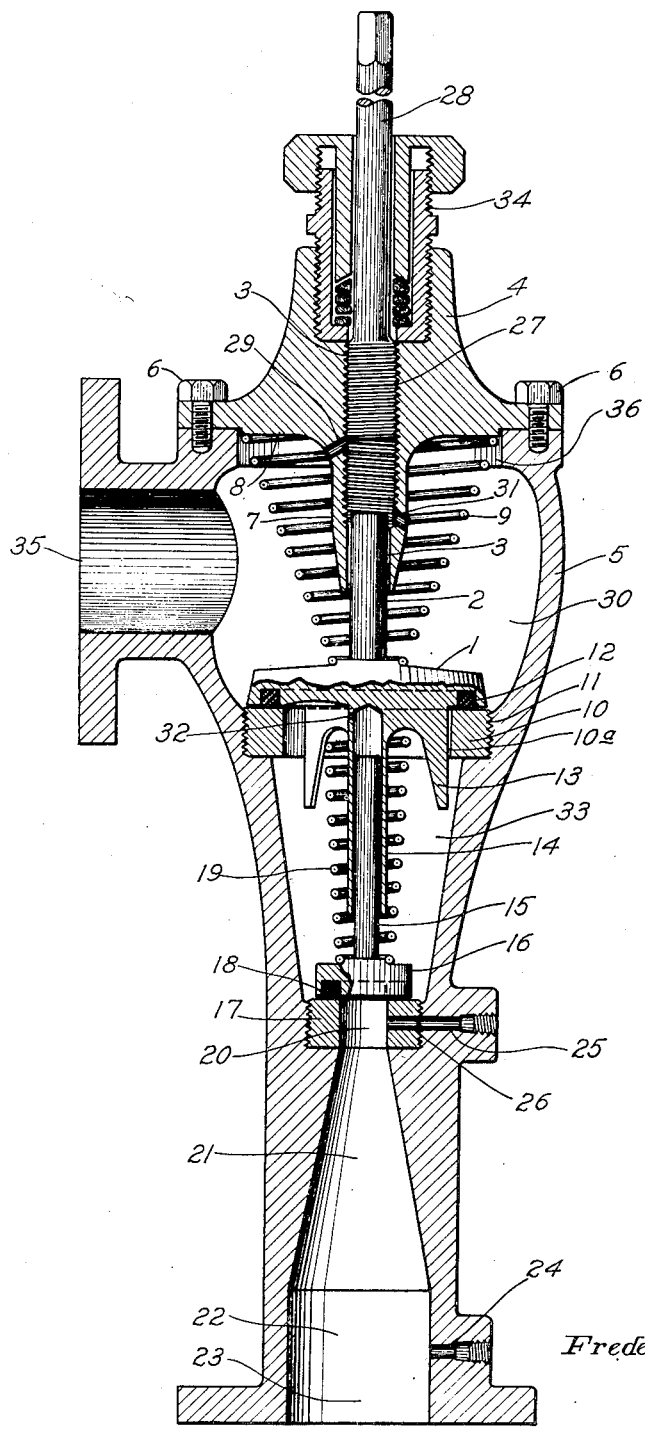

2,500,156

UNITED STATES PATENT OFFICE 2,500,156

VALVE AND METER APPARATUS

Frederick H. Dechant, United States Navy

Application June 8, 1945, Serial No. 598,345

3 Claims. (Cl. 277—42)

(Granted under the act of March 3, 1883, as amended April 30, 1928; 370 O. G. 757)

The invention relates to improvements in valve and metering apparatus.

More particularly the invention relates to a combination double check and stop valve assembly with provision for metering the fluid to be passed through the valve means.

An object of the invention is the provision of an apparatus capable of effectively preventing contamination of a fresh water or other supply with undesired water or other substances such as polluted water or salt water, as for example, in ship to shore fresh water service connections.

A further object is to provide valve apparatus with means for metering the fluid to be passed or served through the valve means.

Another object is the provision of such a valve assembly with adjustable stop means for retaining the valve means in closed condition when desired.

Still another object is the provision of a double check valve assembly in which means are provided to positively guide the valves to insure accurate seating thereof.

A still further object of the invention is to provide a valve and metering apparatus in which provision is made for removal of all internal parts through a single connection.

Other objects and advantages of the invention will be more apparent from the following description taken in connection with the accompanying drawings which are exemplary and in which:

The single figure is a sectional view of one form of apparatus embodying the invention.

Referring to the drawings, the numeral 1 represents a main poppet or check valve having a valve stem 2 guided in the bore 3 in the bonnet or closure member 4 which is secured to the body or housing 5 of the apparatus by screws 6, for example, or other suitable securing means.

The bonnet 4 desirably may be provided with a reduced portion 7 extending from a surface 8 thereof. A preferably tapered coil spring 9 preferably seats against the surface 8 of the bonnet and surrounds the reduced portion 7 of the bonnet and bears at its opposite end upon the valve 1, urging it toward seating position.

The main check or poppet valve 1 seats upon a valve seat 10 which desirably may be threaded into the body 5 of the assembly as indicated at 11. The valve 1 is provided with a flat faced seat ring 12 which is preferably removable and which may be of any suitable material such as rubber, leather, or lead. The valve 1 has projecting portions 13 which serve as guides for the valve in its motion to and from the valve seat 10, the guide portions being guided within the bore or opening 10a of the valve seat.

The main valve 1 is also provided with an axially disposed tubular extension 14, slidably receiving and guiding the stem 15 of a second poppet check valve 16.

The smaller valve 16 desirably seats on valve seat 17 which may be threaded or otherwise secured in the body 5 of the valve and meter apparatus. The valve 16 is provided with a preferably removable flat-faced seat ring 18 similar to the seat ring 12 of valve 1, and is spring pressed by tapered coil spring 19 disposed between the valve 1 and the valve 16.

The main poppet valve is guided top and bottom and the throat poppet valve 16 is guided in the long sleeve bearing 14 in the main poppet, thereby insuring accurate and prompt seating of the valves by the structure of the present invention.

The bore or opening 20 of the valve seat 17 constitutes the reduced or metering throat of a Venturi meter or Venturi tube 21, which tapers from the bore 22 to the throat 20.

The metering is accomplished by measurement of the differential pressure between the bore and throat of the Venturi tube, by a suitable instrument, for example such as a standard properly calibrated type of solenoid electric manometer. This may be used to measure the quantity of water passing through the device through its inlet 23 from the service connection or supply. Connection openings or meter taps 24 and 25 are provided through the body of the device at the bore 22 and throat 20 of the venturi, an opening 26 being desirably provided in the seat ring 17 in registration with the opening or passage 25.

The bore 3 in the bonnet 4 preferably extends through the bonnet to the outside of the bonnet and is preferably threaded at its upper portion to receive a threaded portion 27 of a spindle 28. The spindle 28 is adapted to be turned down against the upper end of the stem 2 of the valve 1 forming a positive stop against the opening of the valve, when desired, as when the valve and meter device is not in use.

When the device is in use, the stop spindle 28 is turned outwardly preferably to retract it beyond a port or opening 29 extending through the wall of the bonnet 4, and establishing communication between the interior of the bore 3 of the bonnet and the valve chamber 30. A second port or opening 31 is provided in the tubular extension 7 of the bonnet 4, nearer the end of said tubular extension 7 than is said opening 29.

The ports 29 and 31 are adapted to be uncovered when the spindle 28 is retracted outwardly substantially in the position as illustrated, and when the valve 1 is in closed position with the valve stem 2 substantially in the position illustrated.

The spindle 28 preferably passes through a packing gland 34 mounted in the bonnet 4.

The valve 1 is also provided, in the wall of its tubular extension 14, with a port 32 which provides communication between the bore of the tubular portion 14 and the valve chamber 33.

The valve chamber 33 desirably flares outwardly from the throat 20, and the valve chamber 30 is desirably larger than the chamber 33.

The valve chamber 30 communicates directly with the outlet opening 35 of the device, which may desirably be connected by any suitable means to means such as a hose (not shown) for providing fresh water service from shore to ship or for other purposes.

It will be apparent from the construction according to the present invention, as illustrated in the exemplary drawings, that the internal parts of the double check and stop valve and metering apparatus of the present invention, are all removable through the bonnet connection opening 36 in the body 5.

In the operation of the device, the spindle is retracted substantially to the position shown by way of example in the drawings, and the water or other fluid supply is admitted from a suitable service connection to inlet opening 23. The fluid passes through the Venturi meter and the pressure of the fluid opens the throat valve 16 admitting the fluid into the chamber 33 and against the main poppet or check valve 1.

The pressure of the fluid passing through the chamber 33 opens the main valve 1 whereupon the fluid enters chamber 30 and passes through outlet opening 35.

The springs 19 and 9 are made of such strength or lightness that the valves will open properly upon supply of the fluid under pressure to the inlet opening, and yet will close promptly and positively under the closing action of the springs upon cut-off or undue reduction of pressure of the supply to inlet 23, or upon application of a pressure through the outlet opening 35 greater than the supply pressure.

The double check valve construction will thus effectively prevent reverse flow and thereby prevent contamination of the supply by any source of contamination to which the conveying means connected to the outlet 35 may be subjected.

The port or opening 32 permits passage of fluid therethrough in either direction as the stem 15 of the throat valve 16 reciprocates in the long sleeve bearing or tubular extension 14 of the valve 1.

The ports or openings 29 and 31 in the tubular extension 7 of the bonnet 4 permit passage of fluid therethrough to and from the bore 3 in the bonnet and the chamber 30.

The spindle 28 closes the bore 3, and is adjustable in the bore, and may be turned inwardly against the stem 2 of the valve 1 as a positive stop to retain the valve 1 in closed condition.

Upward movement of the valve 1 may be limited by the end of the tubular extension 7, or by the end of the spindle 28.

As hereinbefore described, measurement of the amount of water passing through the device is accomplished by connecting a suitable measuring instrument to the meter taps 24 and 25.

Although but one embodiment of the invention is herein shown and described, it will be understood that various changes in the size, shape, and arrangement of parts may be made without departing from the spirit of the invention and it is not intended to limit the invention other than by the terms of the appended claims.

The invention described herein may be manufactured and used by or for the Government of the United States of America for governmental purposes without the payment of any royalties thereon or therefor.

What is claimed is:

1. In combination, a body or housing, a valve member seating therein, a bonnet closing a large opening in said housing, said bonnet having a centrally disposed reduced portion extending therefrom toward said valve, said bonnet and the reduced central extension thereof having a bore therethrough, said valve member having a stem received and guided in the bore of said reduced central extension of the bonnet, and a stop spindle threadedly received in the bore of the said bonnet in opposed relation in said bore to said stem of the valve member, said stop spindle extending outwardly of the bonnet and housing and adapted to be turned in to engage the end of the valve stem within the limits of said bore to accurately engage and hold the valve in closed condition, said valve member, on the side thereof opposite to said stem, having an elongated axial tubular extension, a second valve member seating in said housing and having a stem received in and guided by said axial tubular extension of said first mentioned valve member, a coil spring seating against the surface of the bonnet and surrounding the reduced central extension of said bonnet and bearing at its opposite end against the said first mentioned valve member, said first mentioned valve member having guide extensions spaced outwardly from said elongated axial tubular extension for guiding said valve member in its seat, and a second coil spring seating against the surface of said first mentioned valve member within the said guide extensions thereof and surrounding the said elongated axial tubular extension thereof and bearing at its opposite end against said second valve member.

2. In combination, a body or housing, a valve member seating therein, a bonnet closing a large opening in said housing, said bonnet having a centrally disposed reduced portion extending therefrom toward said valve, said bonnet and the reduced central extension thereof having a bore therethrough, said valve member having a stem received and guided in the bore of said reduced central extension of the bonnet, and a stop spindle threadedly received in the bore of the said bonnet in opposed relation in said bore to said stem of the valve member, said stop spindle extending outwardly of the bonnet and housing and adapted to be turned in to engage the end of the valve stem within the limits of said bore to accurately engage and hold the valve in closed condition, said valve member, on the side thereof opposite to said stem, having an elongated axial tubular extension, a second valve member seating in said housing and having a stem received in and guided by said axial tubular extension of said first mentioned valve member, a coil spring seating against the surface of the bonnet and surrounding the reduced central extension of said bonnet and bearing at its opposite end against the said first mentioned valve member, said first mentioned valve member having guide extensions spaced outwardly from said elongated axial tubular extension for guiding said valve member in its seat, and a second coil spring seating against the surface of the first mentioned valve member within the said guide extensions thereof and surrounding the said elongated axial tubular extension thereof and bearing at its opposite end against said second valve member, the reduced central extension of said bonnet having a port through its wall communicating with the bore of said bonnet extension, and a second port through the wall adjacent the juncture of said extension with the bonnet and communicating with the said bore of the bonnet, said ports permitting passage of fluid therethrough to and from the bonnet bore and the chamber formed by the housing under movement of the stem of said first mentioned valve disposed in said bore, said ports being uncovered when the spindle is retracted outwardly and when the first mentioned valve is in closed position with the valve stem down.

3. In combination, a body or housing, a valve member seating therein, a bonnet closing a large opening in said housing, said bonnet having a centrally disposed reduced portion extending therefrom toward said valve, said bonnet and the reduced central extension thereof having a bore therethrough, said valve member having a stem received and guided in the bore of said reduced central extension of the bonnet, and a stop spindle threadedly received in the bore of the said bonnet in opposed relation in said bore to said stem of the valve member, said stop spindle extending outwardly of the bonnet and housing and adapted to be turned in to engage the end of the valve stem within the limits of said bore to accurately engage and hold the valve in closed condition, said valve member, on the side thereof opposite to said stem, having an elongated axial tubular extension, a second valve member seating in said housing and having a stem received in and guided by said axial tubular extension of said first mentioned valve member, said first mentioned valve member having guide extensions spaced outwardly from said elongated axial tubular extension for guiding said valve member in its seat, said housing having a Venturi tube adjacent its inlet and, said second valve member being seated in said housing at the throat of the venturi and disposed in a chamber flaring away from the inside of said throat, said first mentioned valve member closing said chamber and disposed in a larger chamber in said housing including said bonnet and the reduced central extension of the bonnet.

FREDERICK H. DECHANT.

REFERENCES CITED

The following references are of record in the file of this patent:

UNITED STATES PATENTS

| Number | Name | Date |
|---|---|---|
| 349,586 | Glace | Sept. 21, 1886 |
| 822,077 | Rich | May 29, 1906 |
| 963,836 | Varlie | July 12, 1910 |
| 1,514,975 | Larner | Nov. 11, 1924 |
| 1,935,874 | Davis | Nov. 21, 1933 |
| 1,960,970 | Fina | May 29, 1934 |
| 1,980,478 | Frentzel | Nov. 13, 1934 |

FOREIGN PATENTS

| Number | Country | Date |
|---|---|---|
| 6,343 | Australia | June 29, 1927 |
| 7,716 | Great Britain | May 14, 1884 |